(12) United States Patent
Hatano et al.

(10) Patent No.: US 12,280,558 B2
(45) Date of Patent: *Apr. 22, 2025

(54) VULCANIZATION MOLD AND PNEUMATIC TIRE MANUFACTURED WITH THE MOLD

(71) Applicant: BRIDGESTONE CORPORATION, Tokyo (JP)

(72) Inventors: Tatsuhiko Hatano, Tokyo (JP); Yasuo Shibata, Tokyo (JP); Tatsuya Nakai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 733 days.

This patent is subject to a terminal disclaimer.

(21) Appl. No.: 17/311,128

(22) PCT Filed: Nov. 15, 2019

(86) PCT No.: PCT/JP2019/044939
§ 371 (c)(1),
(2) Date: Jun. 4, 2021

(87) PCT Pub. No.: WO2020/129502
PCT Pub. Date: Jun. 25, 2020

(65) Prior Publication Data
US 2021/0379850 A1    Dec. 9, 2021

(30) Foreign Application Priority Data

Dec. 19, 2018  (JP) ................................ 2018-237713

(51) Int. Cl.
*B29D 30/06*   (2006.01)
*B29C 33/34*   (2006.01)

(52) U.S. Cl.
CPC .......... *B29D 30/0606* (2013.01); *B29C 33/34* (2013.01); *B29D 2030/0613* (2013.01)

(58) Field of Classification Search
CPC ........ B29D 30/0606; B29D 2030/0613; B29C 33/34
See application file for complete search history.

(56) References Cited

U.S. PATENT DOCUMENTS

| 2,121,955 A | 6/1938 | Eger |
| 2005/0056357 A1 | 3/2005 | Prost |

(Continued)

FOREIGN PATENT DOCUMENTS

| CN | 103481410 A | 1/2014 |
| CN | 107708980 A | 2/2018 |

(Continued)

OTHER PUBLICATIONS

Jan. 7, 2020 International Search Report issued in International Patent Application No. PCT/JP2019/044940.
Jun. 16, 2021 International Preliminary Report on Patentability issued in International Patent Application No. PCT/JP2019/044940.

(Continued)

*Primary Examiner* — Seyed Masoud Malekzadeh
(74) *Attorney, Agent, or Firm* — Oliff PLC

(57) ABSTRACT

A vulcanization mold including blades having a distal end side and pullout is performed smoothly without causing any failure and a pneumatic tire. A vulcanization mold in which a blade has a proximal end, a blade distal end side expanded in a thicknesswise direction on the distal end side, and a blade connection portion that connects the proximal end portion and the blade distal end side is a vulcanization mold in which a sweep area is the difference where a cross sectional area of the blade connection is subtracted from an area blade distal end side to a mold surface with a width equal to a maximum width of a thickness of the blade distal end side in a cross sectional shape perpendicular to a tire widthwise direction of the blade is smaller in circumferential end side regions than in a circumferential central side region of the sector mold.

2 Claims, 6 Drawing Sheets

(56) References Cited

U.S. PATENT DOCUMENTS

| | | | |
|---|---|---|---|
| 2005/0150582 A1 | 7/2005 | Matsumura | |
| 2009/0035404 A1 | 2/2009 | Hana et al. | |
| 2010/0218867 A1 | 9/2010 | Matsumoto | |
| 2012/0048439 A1* | 3/2012 | Christenbury | B60C 11/1218 425/54 |
| 2013/0213542 A1 | 8/2013 | Warfford et al. | |
| 2014/0084512 A1* | 3/2014 | Tanaka | B29C 33/424 264/293 |
| 2016/0067934 A1* | 3/2016 | Kawagoe | B29D 30/0629 152/209.1 |
| 2018/0169983 A1* | 6/2018 | Ueno | B29D 30/0629 |
| 2021/0379848 A1* | 12/2021 | Hatano | B29D 30/0606 |
| 2021/0379849 A1* | 12/2021 | Hatano | B60C 11/04 |

FOREIGN PATENT DOCUMENTS

| | | | | |
|---|---|---|---|---|
| EP | 2821212 A2 | | 1/2015 | |
| EP | 3 254 819 A1 | | 12/2017 | |
| JP | H09-039116 A | | 2/1997 | |
| JP | H09-216504 A | | 8/1997 | |
| JP | H10-052824 A | | 2/1998 | |
| JP | 2006-334872 A | | 12/2006 | |
| JP | 2009-255734 A | | 11/2009 | |
| JP | 2009-286204 A | | 12/2009 | |
| JP | 2010-023324 A | | 2/2010 | |
| JP | 2010-173099 A | | 8/2010 | |
| JP | 2010202009 A | * | 9/2010 | B60C 11/12 |
| JP | 2011-183885 A | | 9/2011 | |
| JP | 2012-035535 A | | 2/2012 | |
| JP | 2012-035542 A | | 2/2012 | |
| JP | 2012-096471 A | | 5/2012 | |
| JP | 2012-101383 A | | 5/2012 | |
| JP | 2013-129327 A | | 7/2013 | |
| JP | 2013-244811 A | | 12/2013 | |
| JP | 2014-079949 A | | 5/2014 | |
| JP | 2014-237434 A | | 12/2014 | |
| JP | 2018-144258 A | | 9/2018 | |

OTHER PUBLICATIONS

Feb. 10, 2020 International Search Report issued in International Patent Application No. PCT/JP2019/044939.
Jun. 16, 2021 International Preliminary Report on Patentability issued in International Patent Application No. PCT/JP2019/044939.
Jan. 7, 2020 International Search Report issued in International Patent Application No. PCT/JP2019/044941.
Jun. 16, 2021 International Preliminary Report on Patentability issued in International Patent Application No. PCT/JP2019/044941.
U.S. Appl. No. 17/311,123, filed Jun. 4, 2021 in the name of Tatsuhiko Hatano et al.
U.S. Appl. No. 17/311,124, filed Jun. 4, 2021 in the name of Tatsuhiko Hatano et al.
Oct. 25, 2022 Extended European Search Report issued in European Patent Application No. 19900457.3.
Yaguchi, Tire culcanization mold, May 2014, JP2014079949A, Espacenet machine translation. (Year: 2014).
Matsumoto, Pneumatic Tire, Sep. 2010, JP2010202009A, Espacenet machine translation. (Year: 2010).
Sep. 8, 2023 Office Action issued in in U.S. Appl. No. 17/311,123.
Sep. 8, 2023 Office Action issued in in U.S. Appl. No. 17/311,124.
Oct. 7, 2022 Extended European Search Report issued in European Patent Application No. 19897605.2.
Oct. 7, 2022 Extended European Search Report issued in European Patent Application No. 19899526.8.
Aug. 12, 2024 Office Action issued in U.S. Appl. No. 17/311,123.
Weber, EP-2821212-A2, machine translation. (Year: 2015).
Yaguchi, JP2014079949A, machine translation. (Year: 2014).
Ikemura, JP2010173099A, machine translation. (Year: 2010).
Aug. 13, 2024 Office Action issued in U.S. Appl. No. 17/311,124.
Patent Cooperation Treaty (PCT): PCT International Search and Preliminary Examination Guidelines, p. 113. (Year: 2017).
Kimura, JP 2010023324 A, machine translation. (Year: 2010).
Dec. 19, 2024 Notice of Allowance issued in U.S. Appl. No. 17/311,123.
Nov. 27, 2024 Notice of Allowance issued in U.S. Appl. No. 17/311,124.

* cited by examiner

VULCANIZATION MOLD AND PNEUMATIC TIRE MANUFACTURED WITH THE MOLD

TECHNICAL FIELD

The present invention relates to a vulcanization mold for forming widthwise grooves on a tire tread and a pneumatic tire manufactured with the mold.

BACKGROUND ART

Widthwise grooves such as sipes provided so as to extend in a tire widthwise direction on a tire tread contribute to drainage in addition to the expected edge effect.

However, when abrasion of the tread surface progresses as a result of traveling, the rigidity of the tread part increases, and this degrades the edge effect and, as the groove depth decreases, the drainage is sometimes degraded to deteriorate the wet performance.

Thus, an example is available in which the width of the bottom portion of widthwise grooves of the tire tread is increased such that, even if abrasion of the tread surface progresses, the edge effect and the wet performance can be maintained (for example, refer to Patent Document 1).

PRIOR ART DOCUMENT

Patent Documents

Patent Document 1: JP 2013-129327 A
Patent Document 2: JP 2006-334872 A

In a pneumatic tire disclosed in Patent Document 1, a plurality of sipes are provided so as to extend in a tire widthwise direction on blocks partitioned by main grooves and transverse grooves of the tire tread.

The sipes include expanded bottom portion sipes having an expanded portion at a bottom portion thereof, and such expanded bottom portion sipes are provided substantially uniformly without being one-sided in the circumferential direction on an outer circumferential face of the tire tread.

Normally, the tread part of a pneumatic tire is vulcanization molded with an annular mold of a vulcanization mold.

The annular mold is split into a plurality of sector molds in a circumferential direction, and the sector molds are moved in directions toward the center and combined to clamp a raw tire on the inner side to vulcanization mold the raw tire (for example, refer to Patent Document 2).

On a mold surface of the sector molds, blades that are thin plate-like members extending in a tire widthwise direction, which form sipes and so forth, are implanted.

Since a sipe is formed perpendicularly to the tread outer surface, namely, in such a manner as to cut in toward the tire center axis, a blade provided on the mold surface of a sector mold is implanted perpendicularly to the mold surface, namely, in such a manner as to protrude toward the center axis when the sector molds are combined annularly.

A blade for holding an expanded bottom portion sipe has a distal end side thick portion expanded in its thicknesswise direction on the distal end side thereof.

SUMMARY OF THE INVENTION

Underlying Problem to be Solved by the Invention

Since sector molds are moved in directions toward the center and combined to perform vulcanization molding, when mold opening is to be performed after the vulcanization molding, the sector molds are moved in radial directions away from the center.

Accordingly, the protruding direction of each blade protruding perpendicularly to the mold face of the sector mold is, in a circumferential central portion side region of the sector mold, a substantially parallel direction to a direction in which the blade is pulled out from the tire tread at the time of mold opening (in a radial direction away from the center of the sector mold). Thus, even a blade having a distal end side thick portion is easily pulled out from the mold under low resistance because the distal end side thick portion is pulled out substantially in parallel to the protruding direction.

However, in regard to each blade in a circumferential end portion side region of the sector mold, the protruding direction is not parallel to a direction in which the blade is pulled out from the tire tread at the time of mold opening but has some angle. Therefore, a blade having the distal end side thick portion tends to be pulled out in a direction having the angle with respect to the protruding direction. Consequently, the blade is acted upon by comparatively high resistance and pullout of the blade from the mold is not easy, and in some cases, such a failure as missing of part of blocks or damage to a mold is liable to occur.

The present invention has been made taking such a point as just described into consideration, and it is an object of the present invention to provide a vulcanization mold that is a mold including blades having a distal end side thick portion and by which pullout from the mold is performed smoothly without causing any failure and a pneumatic tire manufactured using the vulcanization mold.

Means to Solve the Problem

In order to achieve the object described above, according to the present first invention, there is provided a vulcanization mold in which an annular mold for forming a tire tread of a pneumatic tire is split in a circumferential direction into a plurality of sector molds and the sector molds are moved in directions toward the center and combined with each other to clamp a raw tire on the inner side to vulcanization mold the raw tire, each of the sector molds having blades implanted on a mold surface thereof, the blades being thin plate-like members extending in a tire widthwise direction and being used to form groove lines on the tire tread, each of the blades having a blade proximal end portion to be embedded into the sector mold, a blade distal end side thick portion expanded in a thicknesswise direction on the distal end side, and a blade connection portion that connects the blade proximal end portion and the blade distal end side thick portion to each other, in which a sweep area that is the difference where a cross sectional area of the blade connection portion is subtracted from an area from the blade distal end side thick portion to the mold surface with a width equal to a maximum width of a thickness of the blade distal end side thick portion in a cross sectional shape perpendicular to the tire widthwise direction of the blade is smaller at the blades in circumferential end portion side regions than at the blades in a circumferential central portion side region of the sector mold.

The sweep area that is the difference where the cross sectional area of the blade connection portion is subtracted from the area from the blade distal end side thick portion to the mold surface with the width equal to the maximum width of the thickness of the blade distal end side thick portion in a cross sectional shape perpendicular to the tire widthwise direction of the blade indicates a degree of difficulty in pullout from the mold and, as the sweep area decreases, pullout from the mold becomes easier.

According to the configuration described above, by making the sweep area of the blade in the circumferential end portion side regions, which is less easier in pullout from the mold than the blade in the circumferential central portion side region of the sector mold, smaller than the sweep area of the blade in the circumferential central portion side region, pullout of the entire sector mold can be performed smoothly without causing failure at the time of mold opening of the vulcanization mold.

A preferred embodiment of the present invention is the vulcanization mold, in which a multiplication value obtained by multiplying the sweep area by the full length of a protruding side that protrudes from the sector mold of the blade connection portion of the blade is lower at the blades in the circumferential end portion side regions than at the blades in the circumferential central portion side region of the sector mold.

The full length of the protruding side of the blade connection portion of the blade protruding from the sector mold (side protruding from the mold surface) indicates a degree of difficulty in pullout from the mold, and as the full length of the protruding side of the blade connection portion decreases, the resistance at the time of pullout from the mold becomes lower, and the pullout from the mold becomes easier.

Therefore, the multiplication value obtained by multiplying the sweep area by the full length of the protruding side of the blade connection portion indicates a degree of difficulty in pullout from the mold, and as the multiplication value decreases, pullout from the mold becomes easier.

According to the configuration described above, by making the multiplication value of the full length and the sweep area of the protruding side of the blade connection portion in the circumferential direction end portion side regions, which blade is less easier in pullout from the mold than the blade in the central portion side region of the sector mold, lower than the multiplication value of the full length and the sweep area of the protruding side of the blade connection portion in the central portion side region, pullout of the entire sector mold can be performed smoothly without causing failure at the time of mold opening of the vulcanization mold.

The present second invention is a pneumatic tire manufactured using the vulcanization mold.

According to this configuration, the pneumatic tire manufactured using the vulcanization mold makes pullout from the mold at the time of mold opening smooth, and the manufacture efficiency can be increased without causing mold pullout failure such as missing of part of blocks.

Effects of the Invention

According to the present invention, by making the sweep area of the blade in the circumferential end portion side regions, which blade is less easier in pullout from the mold than the blade in the central portion side region of the sector mold, smaller than the sweep area of the blade in the central portion side region, pullout of the entire sector mold can be performed smoothly without causing failure at the time of mold opening of the vulcanization mold.

MODES FOR CARRYING OUT THE INVENTION

In the following, an embodiment according to the present invention is described with reference to FIGS. 1 to 6.

Figure 1:
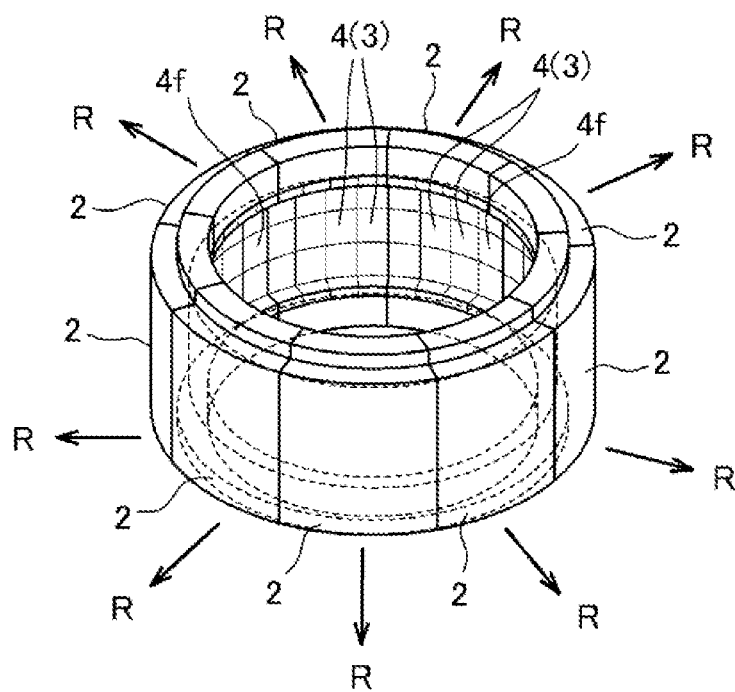
FIG. 1 is a general schematic view of a vulcanization mold according to an embodiment of the present invention.

A vulcanization mold 1 for a tire according to the present embodiment is split into a plurality of sectors (in the present embodiment, into nine sectors) in a circumferential direction as depicted in FIG. 1, and a holder 2 of each sector holds, on the inner circumference side thereof, a sector mold 3 for molding the tread part of a tire.

The sector mold 3 itself held by the holder 2 is a mold of the split mold type configured from a combination of a plurality of split molds 4, and each holder 2 holds a plurality of split molds 4 split in a circumferential direction to configure the sector mold 3.

Each holder 2 is slidably movable in a diametrical direction, and when all holders 2 slidably move in a centrifugal direction at the same time, the vulcanization mold 1 is opened to a large diameter concentric circle and a raw tire can be set to the inner side center of the vulcanization mold 1.

Then, all the holders 2 are slidably moved toward the center all at once with a raw tire placed in the inside thereof to close the vulcanization mold 1 to configure an annular mold as depicted in FIG. 1, and vulcanization molding of the raw tire on the inner side is performed.

Figure 2:
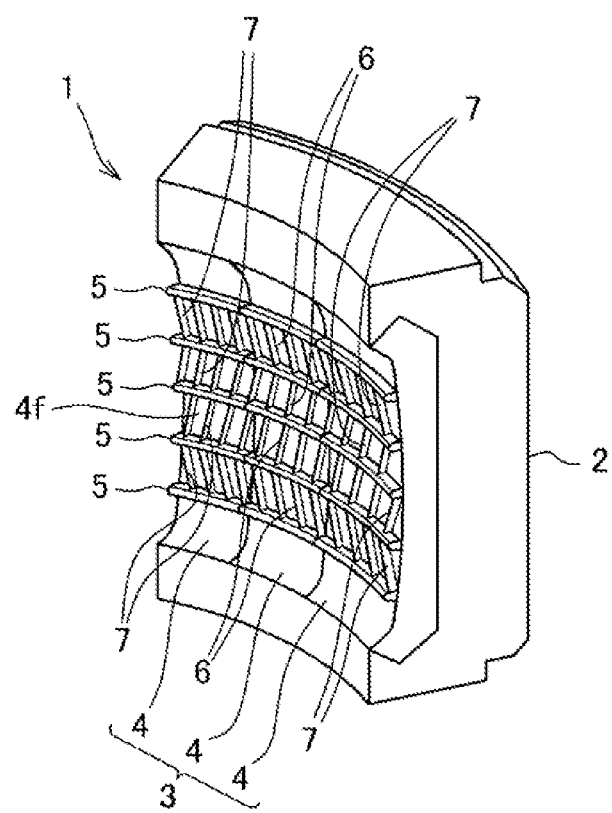
FIG. 2 is a perspective view of one sector of the vulcanization mold.

FIG. 2 is a perspective view of the holder 2 of one sector and a plurality of split molds 4 held by the holder 2.

Circumferential ridges 5 extending in a tire circumferential direction are formed so as to protrude from a mold surface 4f of the split mold 4, and on the sector mold 3 in which such split molds 4 are combined, five continuous circumferential ridges 5 are formed in a tire widthwise direction so as to form circumferential grooves therebetween.

On the mold surface 4f of the sector mold 3, blades 6 and 7 that are thin plate-like members are implanted between adjacent ones of the circumferential ridges 5 such that they extend in a rather inclined relationship in the tire widthwise direction.

The plurality of blades 6 and 7 are arrayed substantially uniformly in the tire circumferential direction and in parallel to each other.

Figure 3:
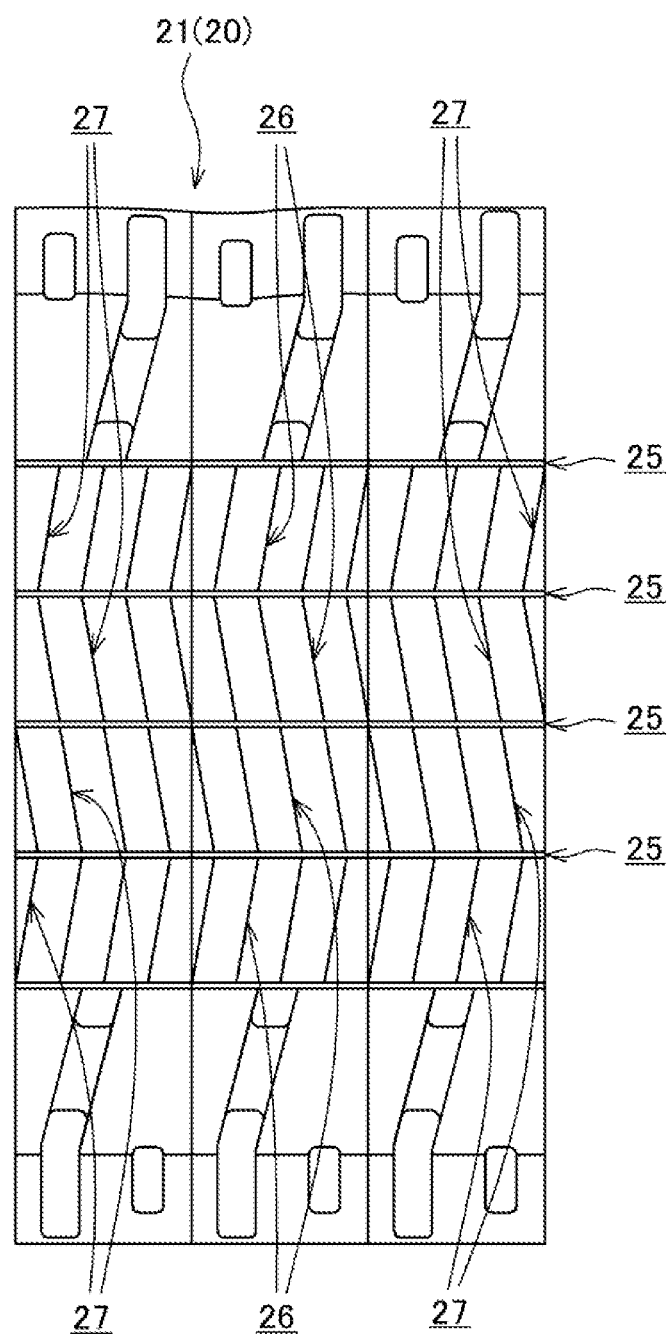
FIG. 3 is a development view of a tread surface of a tire tread molded with a sector mold.

FIG. 3 is a development view of the tread surface of a tire tread 21 of a manufactured pneumatic tire 20 molded by a sector mold 3.

Five tire circumferential grooves 25 are formed in the tire circumferential direction with the circumferential ridges 5 of the sector mold 3 such that they are arrayed in the tire widthwise direction.

On land portions between adjacent ones of the tire circumferential grooves 25, sipes 26 and 27 that are widthwise grooves are formed with the blades 6 and 7 of the sector mold 3 such that they communicate the tire circumferential grooves 25 with each other.

Figure 4:
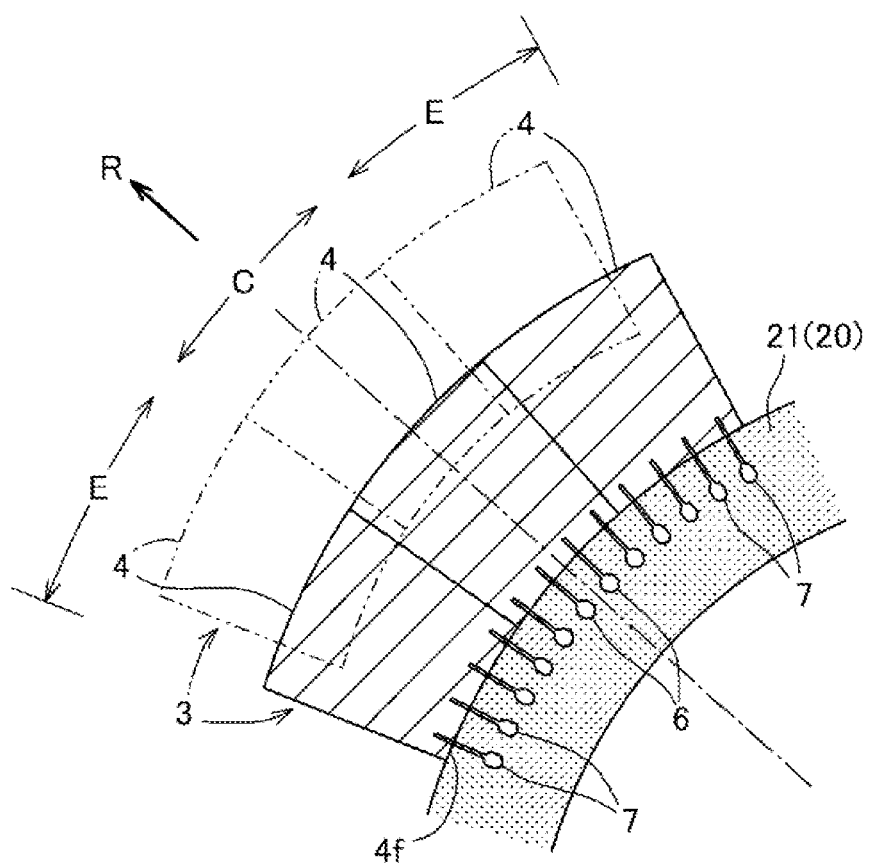
FIG. 4 is a cross sectional view perpendicular to a tire widthwise direction of the sector mold of the vulcanization mold.

FIG. 4 is a sectional view of the sector mold 3 perpendicular to the tire widthwise direction.

Referring to FIG. 4, although the blades 6 in a circumferential central portion side region C and the blades 7 in circumferential end portion side regions E protrude perpendicularly from the mold surface 4f, they are different in shape from each other.

It is to be noted that the circumferential central portion side region C has a region width of approximately 50% of the circumferential total region width of the sector mold 3 and regions on the opposite sides of the circumferential central portion side region C are circumferential end portion side regions E.

When mold opening is to be performed, each sector mold 3 is moved in a radial direction R away from the center.

In particular, the radial direction R is a direction in which, at the time of mold opening, the blades 6 and 7 are pulled out from the tire tread 21.

The protruding direction of each of the blades 6 protruding perpendicularly to the mold surface 4f in the circumferential central portion side region C is substantially parallel to the radial direction R in which the blade is pulled out from the tire tread at the time of mold opening, and even though the blade 6 has a blade distal end side thick portion 6c, the blade distal end side thick portion 6c is pulled out in parallel to the protruding direction. Therefore, the resistance is low and the blade 6 can be pulled out readily from the mold.

On the other hand, the protruding direction of each of the blades 7 in each circumferential end portion side region E of the sector mold 3 is not parallel to the radial direction R in which the blade 7 is pulled out from the tire tread at the time of mold opening and has a certain angle. Therefore, the blade 7 having a blade distal end side thick portion 7c is acted upon by high resistance because the blade distal end side thick portion 7c tends to be pulled out in the direction R having an angle with respect to the protruding direction. Consequently, pullout of the blade 7 from the mold is not easy in comparison with that of the blade 6 in the circumferential central portion side region C.

Therefore, the blades 6 in the circumferential central portion side region C and the blades 7 in the circumferential end portion side regions E are different in shape from each other.

Figure 5:
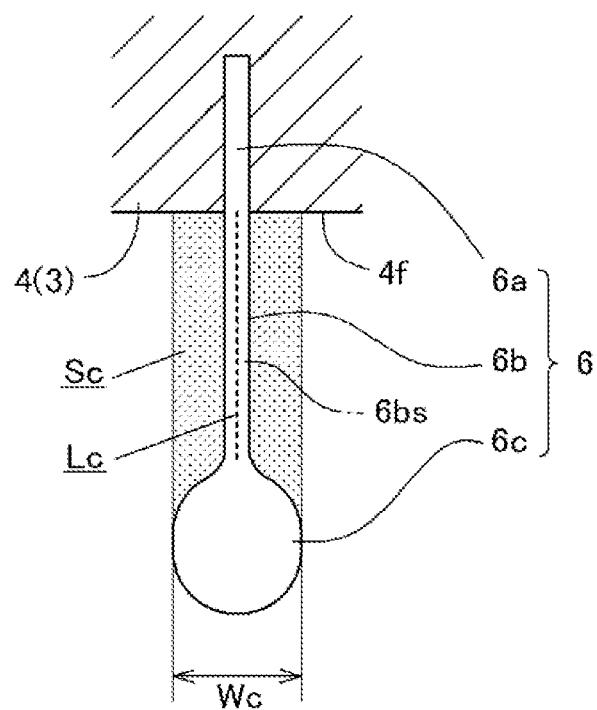
FIG. 5 is an enlarged sectional view of a blade in a circumferential central portion side region C.

An enlarged sectional view of a blade 6 in the circumferential central portion side region C is depicted in FIG. 5.

The blade 6 has a blade proximal end portion 6a to be embedded into the sector mold 3, a blade distal end side thick portion 6c expanded in the thicknesswise direction on the distal end side and a blade connection portion 6b that connects the blade proximal end portion 6a and the blade distal end side thick portion 6c to each other.

The blade proximal end portion 6a and the blade connection portion 6b have a form of a thin plate of a fixed plate thickness and have a linear cross section. The cross sectional shape of the blade connection portion 6b depicted in FIG. 5 is a same shape as that of a protruding side 6bs of the blade connection portion 6b protruding from the sector mold 3, and therefore, the cross section of the blade connection portion 6b depicted in FIG. 5 is denoted by the reference sign 6bs of the protruding side.

In the following, in any cross sectional view of a blade, the cross section of the blade connection portion is denoted by the reference sign of the protruding side.

The full length of the protruding side 6bs of the blade connection portion 6b (length of the side of the blade connection portion 6b in the form of a thin plate protruding from the mold surface 4f, length of a broken line depicted in FIG. 5) is Lc.

The blade distal end side thick portion 6c has a circular cross sectional shape depicted in FIG. 5, and the diameter of the circular shape is a maximum width Wc of the thickness of the blade distal end side thick portion 6c expanded in the thicknesswise direction.

In the cross sectional view depicted in FIG. 5, the sweep area that is the difference where the sectional area of the blade connection portion 6b is subtracted from the area from the blade distal end side thick portion 6c to the mold surface 4f with a width equal to the maximum width Wc of the thickness of the blade distal end side thick portion 6c (area of a portion indicated by a scattered dot pattern in FIG. 5) is represented by Sc.

The sweep area Sc is an area that becomes resistance when the blade distal end side thick portion 6c and the blade connection portion 6b embedded in the tire tread 21 are pulled out at the time of mold opening and indicates a degree of difficulty in pullout from the mold, and pullout from the mold becomes easier as the sweep area Sc becomes smaller.

Figure 6:
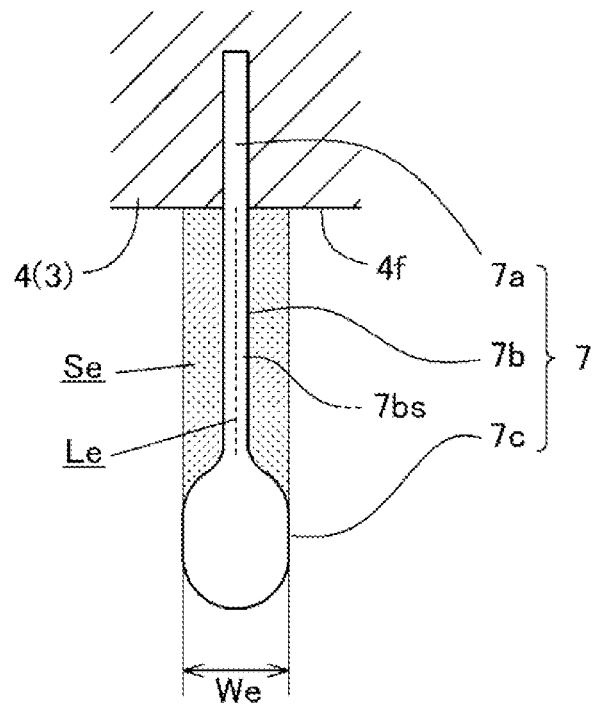
FIG. 6 is an enlarged sectional view of a blade in a circumferential end portion side region E.

An enlarged sectional view of a blade 7 in each circumferential end portion side region E is depicted in FIG. 6.

The blade 7 has a blade proximal end portion 7a to be embedded into the sector mold 3, a blade distal end side thick portion 7c expanded in the thicknesswise direction on the distal end side, and a blade connection portion 7b that connects the blade proximal end portion 7a and the blade distal end side thick portion 7c to each other.

The blade proximal end portion 7a and the blade connection portion 7b have a form of a thin plate of a fixed plate thickness and have a linear cross section. The full length of a protruding side 7bs of the blade connection portion 7b (length of a broken line depicted in FIG. 6) is Le.

The blade distal end side thick portion 7c has an oval cross sectional shape depicted in FIG. 6, and the thickness thereof expanded in the thicknesswise direction is We.

In the cross sectional view depicted in FIG. 6, the sweep area that is the difference where the cross sectional area of the blade connection portion 7b is subtracted from the area from the blade distal end side thick portion 7c to the mold surface 4f with a width equal to the maximum width We of the thickness of the blade distal end side thick portion 7c (area of a portion indicated by a scattered dot pattern in FIG. 6) is represented by Se.

Referring to FIGS. 5 and 6, if the blade 6 in the circumferential central portion side region C and the blade 7 in the circumferential end portion side regions E are compared with each other, then the full length Lc of the protruding side 6bs of the blade connection portion 6b of the blade 6 in the circumferential central portion side region C and the full length Le of the protruding side 7bs of the blade connection portion 7b of the blade 7 in the circumferential end portion side regions E are substantially equal to each other.

However, the width We of the blade distal end side thick portion 7c of the blade 7 in the circumferential end portion side regions E is smaller than the maximum width Wc of the thickness of the blade distal end side thick portion 6c of the blade 6 in the circumferential central portion side region C, and accordingly, the sweep area Se of the blade 7 in the circumferential end portion side regions E is smaller than the sweep area Sc of the blade 6 in the circumferential central portion side region C (Se<Sc).

By making the sweep area Se of the blade 7 in the circumferential end portion side regions E, whose pullout from the mold is less easier than that of the blade 6 in the central portion side region of the sector mold 3, smaller than the sweep area Sc of the blade 6 in the circumferential central portion side region C, pullout from the entire sector mold at the time of mold opening of the vulcanization mold can be performed smoothly without causing any failure.

The pneumatic tire 20 manufactured using the vulcanization mold 1 makes pullout thereof from the mold at the time of mold opening smooth, and the manufacturing efficiency can be increased without causing failure in mold pullout such as missing of part of blocks.

Now, a vulcanization mold according to another embodiment is described with reference to FIGS. 7 to 9.

The sector molds of the present vulcanization mold have a structure same as that of the sector molds 3 and same reference signs are applied to both split molds and circumferential ridges together with the sector molds.

Similarly, same reference signs are used also for the pneumatic tire and the tire tread.

On the mold surface 4f of the sector mold 3, blades 8 and 9 that are thin plate-like members are implanted between adjacent circumferential ridges 5 such that they extend in a rather inclined relationship with respect to the tire widthwise direction.

Figure 7:
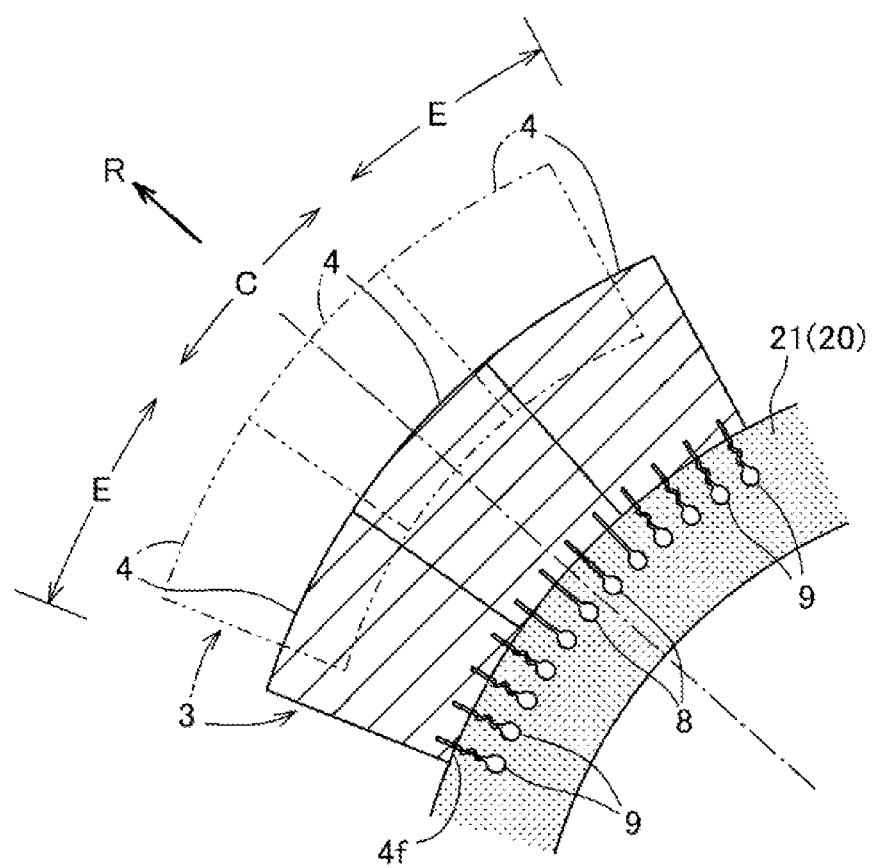
FIG. 7 is a cross sectional view perpendicular to a tire widthwise direction of a sector mold of a vulcanization mold according to another embodiment.

FIG. 7 is a cross sectional view perpendicular to the tire widthwise direction of the sector mold 3 of the present vulcanization mold.

Referring to FIG. 7, blades 8 in the circumferential central portion side region C and blades 9 in the circumferential end portion side regions E protrude perpendicularly from the mold surface 4f.

At the time of mold opening, the blades 8 and 9 are pulled out from the tire tread 21 in a radial direction R in which the sector mold 3 is moved away from the center.

As described hereinabove, in regard to each blade 9 in the circumferential end portion side regions E of the sector mold 3, the protruding direction is not parallel to the radial direction R in which it is pulled out from the tire tread at the time of mold opening but has some angle. Therefore, since the blade 9 having a blade distal end side thick portion 9c tends to be pulled out in the radial direction R having the angle with respect to the protruding direction thereof, it is acted upon by comparatively high resistance, and pullout of the blade 9 from the mold is not easy in comparison with that of the blade 8 in the circumferential central portion side region C.

Therefore, the blades 8 in the circumferential central portion side region C and the blades 9 in the circumferential end portion side regions E have shapes different from each other.

Figure 8:
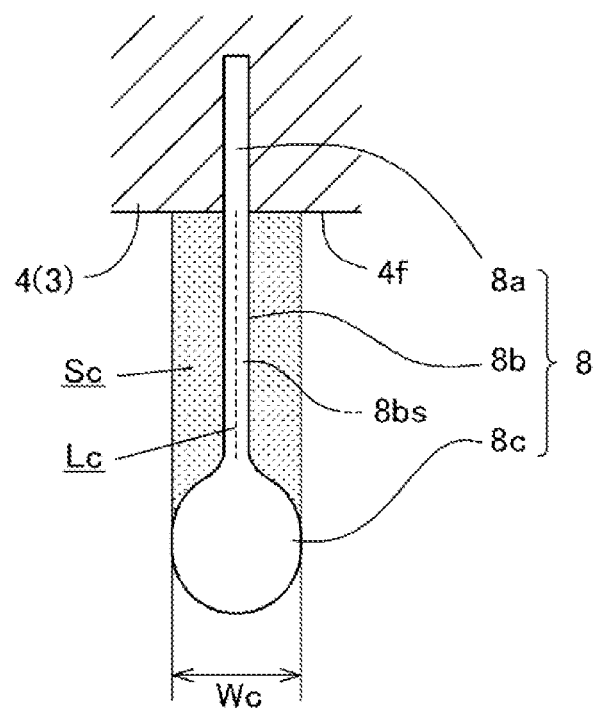
FIG. 8 is an enlarged sectional view of a blade in a circumferential central portion side region C.

An enlarged cross sectional view of a blade 8 in the circumferential central portion side region C is depicted in FIG. 8.

The blade 8 has a blade proximal end portion 8a to be embedded into the sector mold 3, a blade distal end side thick portion 8c expanded in its thicknesswise direction on the distal end side, and a blade connection portion 8b that connects the blade proximal end portion 8a and the blade distal end side thick portion 8c to each other.

The blade proximal end portion 8a and the blade connection portion 8b have a form of a thin plate of a fixed plate thickness and have a linear cross section, and the full length of a protruding side 8bs of the blade connection portion 8b (length of a broken line depicted in FIG. 8) is Lc.

The full length Lc of the protruding side 8bs of the blade connection portion 8b is a length over which the protruding side 8bs is acted upon by resistance when the blade connection portion 8b is pulled out at the time of mold opening and indicates a degree of difficulty in pullout from the mold. As the full length Lc of the protruding side 8bs of the blade connection portion 8b decreases, pullout from the mold becomes easier.

The blade distal end side thick portion 8c has a circular cross sectional shape depicted in FIG. 8, and the diameter of the circular shape is a maximum width Wc of the thickness expanded in the thicknesswise direction of the blade distal end side thick portion 8c.

In the cross sectional view depicted in FIG. 8, the sweep area that is the difference where the cross sectional area of the blade connection portion 8b is subtracted from the area from the blade distal end side thick portion 8c to the mold surface 4f with a thickness equal to the maximum width Wc of the thickness of the blade distal end side thick portion 8c (area of a portion indicated by a scattered dot pattern in FIG. 8) is represented by Sc.

As described hereinabove, the sweep area Sc is an area over which the blade distal end side thick portion 8c and the blade connection portion 8b embedded in the tire tread 21 are acted upon by resistance when they are pulled out at the time of mold opening and indicates a degree of difficulty in pullout from the mold. As the sweep area Sc decreases, pullout from the mold becomes easier.

Figure 9:
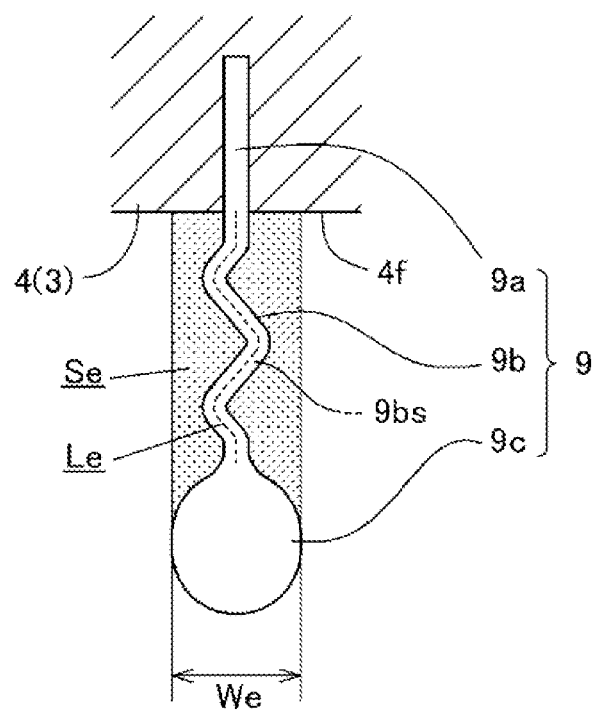
FIG. 9 is an enlarged sectional view of a blade in a circumferential end portion side region E.

An enlarged cross sectional view of a blade 9 in the circumferential end portion side regions E is depicted in FIG. 9.

The blade 9 has a blade proximal end portion 9a to be embedded into the sector mold 3, a blade distal end side thick portion 9c expanded in its thicknesswise direction on the distal end side, and a blade connection portion 9b that connects the blade proximal end portion 9a and the blade distal end side thick portion 9c to each other.

The blade proximal end portion 9a and the blade connection portion 9b have a form of a thin plate of a fixed plate thickness, and while the blade proximal end portion 9a has a linear cross section, the blade connection portion 9b has a cross section bent in a zigzag pattern.

The length of the portion of the cross section of the blade connection portion 9b that is bent in a zigzag pattern (the sum total of the length of the side of the blade connection portion 9b in the form of a thin plate protruding from the mold surface 4f, the length of a broken line depicted in FIG. 9) is the full length Le of a protruding side 9bs of the blade connection portion 9b.

The full length Le of the protruding side 9bs of the blade connection portion 9b is longer by an amount given by the bent portion than the protrusion distance from the mold surface 4f.

The blade distal end side thick portion 9c has a circular cross sectional shape depicted in FIG. 9, and the thickness expanded in the thicknesswise direction is We.

In the cross sectional view depicted in FIG. 9, the sweep area that is the difference where the cross sectional area of the blade connection portion 9b is subtracted from the area from the blade distal end side thick portion 9c to the mold surface 4f with a width equal to the maximum width We of the thickness of the blade distal end side thick portion 9c (area of a portion indicated by a scattered dot pattern in FIG. 9) is represented by Se.

Referring to FIGS. 8 and 9, if the blade 8 in the circumferential central portion side region C and the blade 9 in the circumferential end portion side regions E are compared with each other, then although the sweep area Se of the blade 9 in the circumferential end portion side regions E is smaller than the sweep area Sc of the blade 8 in the circumferential central portion side region C, the full length Le of the protruding side 9bs of the blade connection portion 9b of the blade 9 is greater than the full length Lc of the protruding side 9bs of the blade connection portion 8b of the blade 8 and pullout of the blade connection portion 9b of the blade 9 from the mold is not easy.

Therefore, in the present embodiment, not only the sweep area but also the full length of the protruding side of the blade connection portion indicating another degree of difficulty in pullout from the mold are taken into consideration at the time of design to facilitate pullout of the entire sector mold.

In particular, comparing the multiplication value Mc where the sweep area Sc of the blade 8 in the circumferential central portion side region C is multiplied by the full length Lc of the protruding side 8bs of the blade connection portion 8b of the blade 8 (Mc=Sc×Lc) and the multiplication value Me where the sweep area Se of the blade 9 in the circumferential end portion side regions E is multiplied by the full length Le of the protruding side 9bs of the blade connection portion 9b of the blade 9 (Me=Se×Le) with each other, the multiplication value Me of the blade 9 in the circumferential end portion side regions E is made lower than the multiplication value Mc of the blade 8 in the circumferential central portion side region C (Me<Mc).

As the multiplication value of the sweep area and the full length of the protruding side 8bs of the blade 8 decreases, pullout from the mold becomes easier.

Accordingly, by making the multiplication value Me(=Se×Le) of the blade 9 in the circumferential end portion side regions, which blade is less easier in pullout from the mold than the blade 8 in the central portion side region of the sector mold 3, lower than the multiplication value Mc(=Sc×Lc) of the blade 8 in the circumferential central portion side region, pullout of the entire sector mold can be performed smoothly without causing failure at the time of mold opening of the vulcanization mold.

The pneumatic tire 20 manufactured using the vulcanization mold of the present embodiment makes pullout from the mold at the time of mold opening smooth, and the manufacture efficiency can be increased without causing mold pullout failure such as missing of part of blocks.

Although the vulcanization molds of the two embodiments according to the present invention have been described, the mode of the present invention is not restricted to the embodiments described above, and the present invention includes what are carried out in various modes without departing from the subject matter of the present invention.

For example, although the shapes of the blades of the present invention are not restricted to those of the blades disclosed by the embodiments and various shapes are applicable, it is sufficient only if the blades satisfy the requirements of Claim 1.

Especially, the cross sectional shape of the blade distal end side thick portion is not restricted to a circular shape or an oval shape, and various shapes such as a triangular shape that is a flask shape and other polygonal shapes are applicable.

It is to be noted that the blade distal end side thick portion is a thick portion existing on the distal end side of the blade but does not necessarily exist at the distal end of the blade, and may have such a shape that the thickness decreases from the thick portion toward the inner side in the diametrical direction.

Further, the sweep area or the multiplication value of the blades implanted to the mold surface of the sector mold may be set so as to gradually decrease from blades at a central portion in the circumferential direction to blades on end portion sides in the circumferential direction.

Further, the grooves formed by the blades are not limited to the sipes that are narrow grooves and also include rather wide widthwise grooves extending in the tire widthwise direction.

Furthermore, although the number of circumferential ridges in the embodiments described hereinabove is five, the number of circumferential ridges is not limited to five and may be greater or smaller than five.

REFERENCE SIGNS LIST

1: Vulcanization mold
2: Holder
3: Sector mold
4: Split mold
4f: Mold surface
5: Circumferential ridge
6: Blade
6a: Blade proximal end portion
6b: Blade connection portion
6bs: Protruding side
6c: Blade distal end side thick portion
7: Blade
7a: Blade proximal end portion
7b: Blade connection portion
7bs: Protruding side
7c: Blade distal end side thick portion
8: Blade
8a: Blade proximal end portion
8b: Blade connection portion
8bs: Protruding side
8c: Blade distal end side thick portion
9: Blade
9a: Blade proximal end portion
9b: Blade connection portion
9bs: Protruding side
9c: Blade distal end side thick portion
20: Pneumatic tire
21: Tire tread
25: Tire circumferential groove
26: Sipe
27: Sipe
C: Circumferential central portion side region
E: Circumferential end portion side region
Sc, Se: Sweep area
Lc, Le: Full length of protruding side of blade connection portion

The invention claimed is:

1. A vulcanization mold in which an annular mold for forming a tire tread of a pneumatic tire is split in a circumferential direction into a plurality of sector molds and the sector molds are moved in directions toward a center and combined with each other to clamp a raw tire on an inner side to vulcanization mold the raw tire, each of the sector molds having blades implanted on a mold surface thereof, the blades being plates extending in a tire widthwise direction and being used to form groove lines on the tire tread, each of the blades having a blade proximal end portion to be embedded into the sector mold, a blade distal end side thick portion expanded in a thicknesswise direction on the distal end side, and a blade connection portion that connects the blade proximal end portion and the blade distal end side thick portion to each other, wherein a sweep area that is a difference where a cross sectional area of the blade connection portion is subtracted from an area from the blade distal end side thick portion to the mold surface with a width equal to a maximum width of a thickness of the blade distal end side thick portion in a cross sectional shape perpendicular to the tire widthwise direction of the blades is smaller at the blades in circumferential end portion side regions than at the blades in a circumferential central portion side region of the sector molds.

2. The vulcanization mold as claimed in claim 1, wherein a multiplication value obtained by multiplying the sweep area by a full length of a protruding side that protrudes from the sector molds of the blade connection portion of the blade is lower at the blades in the circumferential end portion side regions than at the blades in the circumferential central portion side region of the sector molds.

* * * * *